Patented June 11, 1935

2,004,458

UNITED STATES PATENT OFFICE 2,004,458

VAT AND SULPHUR DYESTUFF PREPARATION FOR PRINTING COTTON

Hermann Berthold, Leverkusen-I. G. Werk, Germany, assignor to General Aniline Works, Inc., New York, N. Y., a corporation of Delaware No Drawing. Application May 12, 1932, Serial No. 610,976. In Germany May 18, 1931

8 Claims. (Cl. 8—6)

The present invention relates to vat or sulphur dyestuff preparations suitable for printing cotton, to a process of printing cotton fibers with these preparations, and to the printed fabrics obtainable by the application of said dyestuff preparations.

In my co-pending application Serial No. 496,558, filed November 18, 1930, I have described vat and sulphur dyestuff preparations for textile printing, comprising hydroxy anthraquinones or such reduction products thereof as still contain oxygen in the meso-position.

In accordance with the present invention in the said vat and sulphur dyestuff preparations the hydroxy anthraquinones or reduction products thereof containing oxygen in the meso-position are replaced with advantage by sulphur compounds of the anthraquinone series, in particular by anthraquinone mercaptans, salts or ethers thereof or also by anthraquinone thiocyanates or dianthraquinonyl mono- or disulphides or substitution products of these substances or by reduction products thereof, which still contain oxygen in the meso-position. Such substances are, for example, anthraquinone-1- or 2-mercaptan, anthraquinone-1.5-dimercaptan, anthraquinone-2.6- or 2.7-dimercaptan, alkali metal salts of these substances (including ammonium salts), alpha- or beta-anthraquinone thiocyanates, anthraquinone-dithiocyanates, alkyl-, (methyl-, ethyl-, propyl-ethers, for example), aralkyl- or aryl-ethers (benzyl-, phenyl-, naphthyl-ethers, for example) of anthraquinone mercaptans, 1.1'-, 1.2'- or 2.2'- dianthraquinonyl mono- or disulphides, alkyl-, halogen-, hydroxy-, alkoxy and amino substitution products of such substances and the like.

The manner of manufacture of the dyestuff preparations is the same as that described in the co-pending application Serial No. 496,558, filed November 18, 1930. Likewise, the technical advance attained by the addition of the above indicated sulphur compounds of the anthraquinone series is similar to that described in the said co-pending application. In some cases indeed the new dyestuff preparations show even a superiority over those which contain only hydroxy anthraquinones. The sulphur compounds of the anthraquinones series can also be employed in admixture with hydroxy anthraquinones, amino anthraquinones, anthraquinone sulphonic acids or carboxylic acids, the products of the reaction of beta-aminoanthraquinones with aromatic sulfochlorides, anthraquinone itself, or reduction products of these substances, which still contain oxygen in the meso-position. Hydrotropically acting agents, such as are mentioned in my co-pending application Serial No. 496,558 filed Nov. 18, 1930, may likewise be added.

The magnitude of the effect obtainable depends not only on the nature of the dyestuff applied and on the compounds used as additions, but also on the method, by which the printing colors are made up from the dyestuff preparations and on the particular printing methods, and, accordingly, preliminary experiment may have to be resorted to, to ascertain the best conditions of carrying out the process.

The printing methods principally contemplated can be divided into two groups:—

(1) Process of printing with preliminary reduction:

For example—

40–200 grams of dyestuff paste are mixed with
50 grams of glycerine
315–350 grams of water
25–50 grams of caustic soda solution 40° Bé.
20–40 grams of calcined sodium carbonate and
500–450 grams of a thickening containing in 1000 parts by weight:—

280 parts by weight of British gum powder
100 parts by weight of starch
20 parts by weight of the sodium salt of benzylsulphanilic acid and
600 parts by weight of water.

After making the paste 40–90 grams of sodium formaldehydesulphoxylate and 10–40 grams of sodium hydrosulphite are added at 70° C. Textile materials are printed with this printing color in the customary manner, the printing is steamed, for example, in the Mather-Platt and developed and finished in the customary manner.

When the above printing colors contain sulphur compounds of the anthraquinone series or reduction products thereof, which still contain oxygen in the meso-position, stronger printings coupled with better fixation are obtained than without these agents.

The process of printing with preliminary reduction is employed principally for dyestuffs, which vat with difficulty and for those in the form of powder. Attempts are, however, made to replace this process also in these cases by (2) The process of printing without preliminary reduction. The following is an example of such a process:—

The printing color is made up from:—

10-20 grams of dyestuff paste
0-10 grams of water
80 grams of a thickening containing in 1000 parts by weight:—

170 parts by weight of tragacanth 65:1000
160 parts by weight of industrial gum 1:1
60 parts by weight of wheat starch
150 parts by weight of water
60 parts by weight of British gum powder
100 parts by weight of glycerine
150 parts by weight of potassium carbonate or calcined sodium carbonate or a mixture of both and
150 parts by weight of sodium formaldehyde-sulphoxylate.

The textile materials printed with printing colors of the kind indicated are likewise steamed and oxidized to develop the dyestuff and finished in the customary manner.

When the above printing colors contain, for example, anthraquinone-2-mercaptan, the printings obtained in accordance with these directions are usually stronger and better fixed than without the additions. It becomes therefore possible to print by the latter process also such dyestuffs, as have hitherto yielded satisfactory results only by the first process. This fact signifies a considerable technical advance, above all on account of the avoidance of caustic alkalies, which enables a more cautious treatment of the fiber, on account of the increased stability and the applicability of the printing colors applied due to the absence of the readily decomposable hydrosulphite, which is entirely replaced by sodium formaldehyde sulphoxylate. The latter exerts its reducing action only at elevated temperature in the course of the printing process.

It should be expressively stated that these two principal groups of printing methods can indeed be applied with success in most cases, however, modifications of these processes can likewise be employed directly for the present modified process.

The addition of the sulphur compounds of the anthraquinone series can be carried out at any desired stage of the manufacture of the printing pastes, for example:

(a) The dyestuff in the form of a pressed cake containing water (12-40% dyestuff content) is stirred with glycerine or another similar water soluble polyvalent alcohol, such as ethyleneglycol, diethylene glycol, thiodiglycol, thiodiglycerol etc., and a quantity of the addition equal to about 1/20 to ¼ part by weight of the pure dyestuff is stirred in. When the mixtures contain more water than is desirable, they can be concentrated by evaporation.

Thus are obtained uniform, smooth pastes, which do not dry out, do not form crusts or settle, do not freeze and, even after a prolonged period, can still be worked up to valuable printing colors especially when a preserving agent is also added to the pastes.

(b) The dried dyestuff is ground finely and mixed intimately with the likewise finely ground addition. The further addition of an emulsifying agent may be of advantage.

(c) The dyestuff in the form of a pressed cake containing water or in the form of an aqueous paste is evaporated to dryness in the presence of the new addition and, if desired, in the presence of dextrine or of an emulsifying agent.

(d) The dyestuff is reduced in the presence of glycerine or of another similar water soluble polyvalent alcohol, for example, ethyleneglycol, diethyleneglycol, thiodiglycol, thiodiglycerol or the like, with previous, simultaneous or subsequent addition of the new agents. Ammonia, ammonium carbonate, sodium carbonate, potassium carbonate or the like or also mixtures of the same can advantageously be used as the alkali, and hydrosulfite or sodium formaldehyde sulphoxylate as the reducing agents.

(e) The direct addition to the printing color of the substances specified containing sulphur is likewise capable of improving considerably the printing qualities of the dyestuff, in particular, the fixation; for example:—

72 grams of a thickening containing in 1000 parts by weight:—
60 parts by weight of wheat starch
160 parts by weight of water
50 parts by weight of British gum powder
260 parts by weight of industrial gum 1:1
170 parts by weight of tragacanth 65:1000
150 parts by weight of potassium carbonate and
150 parts by weight of sodium formaldehyde sulphoxylate are stirred to form a printing color with
20 grams of the aqueous 10-20% paste of the dyestuff
7.8-7.4 grams of glycerine and
0.2-0.6 gram of anthraquinone-2-mercaptan (ground very finely).

This printing color prints considerably better than one made up with the same thickening and 8 grams of glycerine without the addition of anthraquinone-2-mercaptan.

In all the cases specified under (a) to (e), dyestuff preparations are obtained, which either possess as such technical advantages as regards the pastes produced (see for example, the preparation described under (a)), or display improved printing qualities and fixation as compared with the same preparations without the new addition.

The printing methods, which are preferably to be employed, have already been discussed above. The development of the printings can be carried out by the customary processes, for example, in the following manner:—

After the printed material has been dried, it is steamed with damp steam, and the dyestuff is developed by means of potassium chromate-acetic acid (2 grams of potassium bichromate and 5 ccs. of 30% acetic acid in one litre of water), and subsequent soaping at the boil.

The following examples further illustrate the invention, without limiting it thereto:—

*Example 1*

A printing color made up from 6.6'-diethoxy-2.2'-bisthionaphtheneindigo in the manner described under (e) (wherein the anthraquinone-2-mercaptan can also be replaced by anthraquinone-2.6-dimercaptan or the corresponding disulphides), yields printings considerably better fixed than those from a corresponding printing paste without the addition of anthraquinone mercaptans.

Example 2

An aqueous dyestuff paste containing 40 grams of the dyestuff of the formula:—

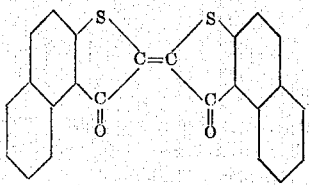

(U. S. P. 888,852)

is introduced into 72 grams of glycerine. To this are added 4 grams of very finely divided anthraquinone-2-mercaptan or an equal quantity of 1-chloro-anthraquinone-2-thiocyanate (prepared by diazotizing 1-chloro-2-amino-anthraquinone and treating the reaction product with potassium thiocyanate), 1-thiocyanate-5-chloro-anthraquinone, 1-thiocyanate-4-hydroxyanthraquinone, anthraquinone-1-thioethylether, 1.1'- or 2.2'-dianthraquinonyl-disulphide, anthraquinone-1-phenyl-mercaptan-sulphonic acid (prepared by reacting upon anthraquinone-1-mercaptan with benzene in the presence of concentrated sulphuric acid and sulphonating the 1-phenyl-mercanto-anthraquinone thus obtained) or 1-thiocyanate-anthraquinone-2-carboxylic acid (prepared by diazotizing 1-aminoanthraquinone-2-carboxylic acid and treating the reaction product with potassium thiocyanate at 90–100° C.). The paste is made up to a dyestuff content of 14% and passed through a fine copper, bronze or nickel sieve. Thus is obtained a uniform, stable paste, which does not settle out, does not freeze or form incrustations and which moreover possesses the advantage of yielding deeper and more rapidly fixing printings than similar dyestuff pastes without the addition of sulphur compounds of the anthraquinone series. Valuable printing preparations can likewise be produced with the additions specified according to the other methods above indicated.

Example 3

Printing colors of dimethoxy-dibenzanthrone (Caledone jade green) or of the dyestuff from 6-methoxy-3-hydroxythionaphthene with 4-methyl-6-bromo-2.3-dihydro-3-ketothionaphthene-2-(paradimethylamino)anil, produced in the manner described under (e), (wherein anthraquinone-2-mercaptan may be replaced by the sulphur compounds specified in Example 2 or by similar isomers or substitution products thereof), yield stronger and better fixed printings than the corresponding printing pastes without the addition of the substances containing sulphur.

Example 4

200 grams of the dyestuff of the formula:—

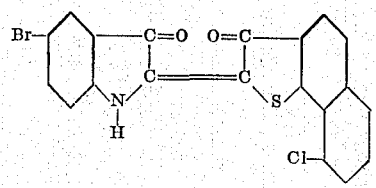

are heated to 70° C. with 750 grams of water
360 grams of glycerine
50 grams of potassium carbonate
50 grams of sodium carbonate and
60 grams of hydrosulphite the dyestuff being thereby reduced. If desired, there may be added before or after the reduction a hydrotropically acting agent, for example, the sodium salt of dimethyl-sulphanilic acid or of dimethylmetanilic acid, urea or a mixture of like substances. 20 grams of anthranquinone-2-mercaptan are stirred into the reduction paste thus obtained, and the paste is made up to a dyestuff content of 18%. The addition of the anthraquinone-2-mercaptan can also be effected before the reduction with the result that the mercaptan is reduced together with the dyestuff. Furthermore, 2.2'-dianthraquinonyl-disulphide can be used instead of the anthraquinone-2-mercaptan.

When such a reduction paste is used for printing, very powerful and well fixed printings are produced. A still deeper black can be obtained, when a yellow or orange colored vat dyestuff is mixed with the dyestuff specified in this example. In this case grey printings, which are distinguished by valuable properties, in particular, by good evenness, can also be obtained.

The reduction paste described in this example displays, as regards stability and satisfactory external form, the advantages ascribed to the paste of Example 2.

Example 5

40 grams of Indocarbon CL (Colour Index Suppl. pg. 43) or of Indocarbon S or SF (Colour Index page 236, No. 970)
4 grams of anthraquinone-2-mercaptan
40 grams of pure or crude glycerine (for example, saponification crude glycerine)
12 grams of hydrosulphite and
100 grams of water are heated with stirring in a vessel immersed in a water bath and finally made up to a dyestuff content of 25–30%.

In the case of sulphur dyestuffs, which are manufactured by sulphiding, the sulphur derivatives indicated can be added before the sulphur fusion; in this case, however, there can also be used instead of the sulphur derivatives, for example, halogen anthraquinones, anthraquinone sulphonic acids and the like, which are then converted in the sulphiding process into anthraquinone sulphur derivatives simultaneously with the production of the dyestuff.

Example 6

75 grams of the dyestuffs mentioned in Example 5 in the form of an aqueous paste weighing 136.5 grams
90 grams of glycerine
7.5 grams of 1.1'-dianthraquinonyl disulphide and if desired
30 grams of a hydrotropically acting agent, for example, the sodium salt of tetrahydro-naphthalene-beta-sulphonic acid or of benzyl-sulphanilic acid are made up to a total weight of 300 grams. The 25% paste thus obtained prints better and fixes more rapidly than preparations produced in a similar manner, but without the use of 1.1'-dianthraquinonyl disulphide.

In this case a further improvement in the printing qualities is to be observed as compared with a dyestuff preparation produced in the same manner, but with replacement of the 1.1'-dianthraquinonyl disulphide by 2.6-dihydroxy anthraquinone.

In the above example the 1.1'-dianthraquinonyl disulphide can likewise be replaced by 2.2'-dianthraquinonyl disulphide.

Other vat dyestuffs of the indigoid or anthraquinoid series or other sulphur dyestuffs can, by the present process, likewise be improved in respect of their printing qualities, that is to say, in respect of the strength of the printing and speed of fixation.

It may be mentioned that, according to the present invention such sulphur dyestuffs yield the technical most valuable results, as already possess affinity to textile fabrics in the printing processes hitherto known (Indocarbon and Hydronblue marks, for example). However, other sulphur dyestuffs will be likewise operable and generally yield good results.

I claim:—

1. Vat and sulphur dyestuff preparations for printing cotton comprising besides the vat or sulphur dyestuffs a compound selected from the group consisting of anthraquinone mercaptans, salts and ethers thereof, anthraquinone thiocyanates, dianthraquinonyl-mono- and disulphides and reduction products of these compounds containing oxygen in the meso-position.

2. A dyestuff preparation for printing cotton comprising an unreduced vat dyestuff and a compound selected from the group consisting of anthraquinone mercaptans, salts thereof and dianthraquinonyl disulphides.

3. A vat or sulphur dyestuff paste for printing cotton comprising besides the vat or sulphur dyestuffs a compound selected from the group consisting of anthraquinone mercaptans, salts and ethers thereof, anthraquinone thiocyanates, dianthraquinonyl-mono- and disulphides, and reduction products of these compounds containing oxygen in the meso-position.

4. A paste for printing cotton comprising 6.6'-diethoxy-2.2'-bisthionaphtheneindigo and a compound selected from the group consisting of anthraquinone-1- and 2-mercaptan and the corresponding disulphides.

5. A paste for printing cotton comprising the dyestuff of the formula:—

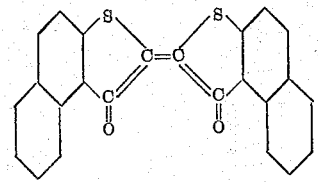

and a compound selected from the group consisting of anthraquinone-1- and -2-mercaptan and the corresponding disulphides.

6. A paste for printing cotton comprising the dyestuff of the formula:—

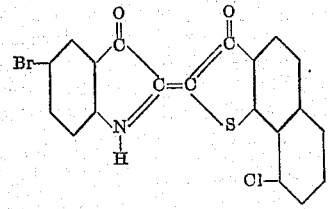

and a compound selected from the group consisting of anthraquinone-1- and -2-mercaptan and the corresponding disulphides.

7. The process which comprises printing cotton with a printing paste derived from a vat or sulphur dyestuff, said paste comprising besides the vat dyestuff a compound selected from the group consisting of anthraquinone mercaptans, salts and ethers thereof, anthraquinone thiocyanates, dianthraquinonyl-mono- and disulphides and reduction products of these compounds containing oxygen in the meso-position.

8. The process which comprises printing cotton with a printing paste derived from a vat dyestuff, said paste comprising besides the vat dyestuff a compound selected from the group consisting of anthraquinone mercaptans, salts and ethers thereof, anthraquinone thiocyanates, dianthraquinonyl-mono- and disulphides and reduction products of these compounds containing oxygen in the meso-position.

HERMANN BERTHOLD.